United States Patent
Chien (10) Patent No.: US 10,277,626 B2
(45) Date of Patent: Apr. 30, 2019

(54) SYSTEMS AND METHODS FOR SUPPRESSING DENIAL OF SERVICE ATTACKS

(71) Applicant: Daniel Chien, Bellevue, WA (US)

(72) Inventor: Daniel Chien, Bellevue, WA (US)

(*) Notice: Subject to any disclaimer, the term of this patent is extended or adjusted under 35 U.S.C. 154(b) by 0 days.

(21) Appl. No.: 15/808,283

(22) Filed: Nov. 9, 2017

(65) Prior Publication Data

US 2018/0131718 A1    May 10, 2018

Related U.S. Application Data (60) Provisional application No. 62/419,746, filed on Nov. 9, 2016.

(51) Int. Cl.
*H04L 29/06* (2006.01)

(52) U.S. Cl.
CPC ...... *H04L 63/1458* (2013.01); *H04L 63/0876* (2013.01); *H04L 63/101* (2013.01); *H04L 63/1408* (2013.01); *H04L 63/1425* (2013.01)

(58) Field of Classification Search
CPC ............ H04L 63/1408; H04L 63/1441; H04L 63/1458; H04L 63/1416; H04L 63/1425; H04L 63/0876; H04L 2463/141; H04L 2463/142; H04L 2463/143
See application file for complete search history.

(56) References Cited

U.S. PATENT DOCUMENTS

| | | | | |
|---|---|---|---|---|
| 7,540,028 B2* | 5/2009 | Ahmed | ............... | H04L 63/1441 726/22 |
| 7,602,731 B2* | 10/2009 | Jain | ..................... | H04L 63/1441 370/252 |
| 7,626,940 B2* | 12/2009 | Jain | ..................... | H04L 63/1408 370/252 |
| 7,832,009 B2* | 11/2010 | Wang | .................... | H04L 63/101 370/241 |
| 7,979,889 B2* | 7/2011 | Gladstone | ............... | G06F 21/52 726/1 |
| 9,172,721 B2* | 10/2015 | Jain | ..................... | H04L 63/1458 |
| 9,825,911 B1* | 11/2017 | Brandwine | ......... | H04L 63/0236 |

(Continued)

OTHER PUBLICATIONS

International Search Report and Written Opinion of the International Searching Authority completed Jan. 26, 2018, in International Patent Application No. PCT/US2017/060889, 6 pages.

*Primary Examiner* — Zachary A. Davis
(74) *Attorney, Agent, or Firm* — Benedict R. Dugan; Lowe Graham Jones PLLC (57) ABSTRACT

Techniques for network traffic filtering and flow control are disclosed. Some implementations provide a network communication evaluation module ("NCEM") that executes on a networking device, such as a gateway or router, and performs network traffic control, such as suppressing denial of service attacks or otherwise limiting packet flow. The NCEM performs packet filtering in order to identify and drop packets that are being (or are likely to be) transmitted as part of a denial of service attack. The NCEM conditionally drops packets that meet specified conditions or rules. For example, the NCEM may drop all packets that are using a nonauthentic source address. As another example, the NCEM may limit the volume of packets of a particular type, such as by limiting the number of DNS requests that are made during a specified time interval.

20 Claims, 4 Drawing Sheets

(56) References Cited

U.S. PATENT DOCUMENTS

| | | | |
|---|---|---|---|
| 9,838,425 B2 * | 12/2017 | Jalan | H04L 63/1466 |
| 2007/0022479 A1 * | 1/2007 | Sikdar | H04L 63/0218 |
| | | | 726/22 |
| 2008/0271118 A1 * | 10/2008 | Greenlaw | H04L 63/1458 |
| | | | 726/3 |
| 2009/0311963 A1 | 12/2009 | Haverty | |
| 2010/0050255 A1 | 2/2010 | Upadhyay et al. | |
| 2012/0077480 A1 | 3/2012 | DeLuca | |

* cited by examiner

SYSTEMS AND METHODS FOR SUPPRESSING DENIAL OF SERVICE ATTACKS

PRIORITY CLAIM

This application claims the benefit of U.S. Provisional Application No. 62/419,746 entitled "SYSTEMS AND METHODS FOR SUPPRESSING DENIAL OF SERVICE ATTACKS" and filed Nov. 9, 2016, the entire contents of which are incorporated herein by reference.

TECHNICAL FIELD

The present disclosure relates to methods, techniques, and systems for suppressing denial of service attacks and related forms of network traffic control.

BACKGROUND

In a Denial of Service ("DOS") attack, a perpetrator seeks to make a machine, network, or service unavailable by flooding the target machines or resources with superfluous requests. In a Distributed Denial of Service ("DDOS") attack, the attack is accomplished by using a large number of network nodes to transmit requests to a target machine or resource. Increasingly, perpetrators are exploiting lax security safeguards employed by "connected devices" (or "smart devices") that are connected to the Internet and are configured to perform functions in and around the home and other sites. Such connected devices include network-connected devices such as thermostats, security cameras, refrigerators, networking devices (e.g., routers, wireless access points), door locks, and the like.

SUMMARY OF THE INVENTION

Embodiments described herein provide methods, devices, and systems for network traffic control, such as suppressing denial of service attacks or otherwise limiting packet flow. One embodiment provides a system for suppressing denial of service attacks, where the system comprises a first computing device that includes a first network interface, a second network interface, a processor, and a memory that stores a code module. The code module is configured, when executed by the processor to: receive, via the first network interface, a packet having a source IP address and a type; determine an allowable packet flow rate associated with the packet type; when the source IP address is non-authentic or when transmitting the packet would exceed the allowable packet flow rate, drop the packet; and otherwise, when the source IP address is authentic and when transmitting the packet would not exceed the allowable packet flow rate, transmit the packet via the second network interface. Other embodiments provide methods and/or computer-readable media that perform functions similar to those of the above-described code module.

DETAILED DESCRIPTION

Embodiments described herein provide enhanced computer- and network-based methods, devices, and systems for network traffic control, such as suppressing denial of service attacks or otherwise limiting packet flow. Some embodiments provide a Network Communication Evaluation Module ("NCEM") that typically executes on a network node. The NCEM performs packet filtering in order to identify and drop packets that are being (or are likely to be) transmitted as part of a DOS attack. In one embodiment, the NCEM conditionally drops packets that meet specified conditions or rules. For example, the NCEM may drop all packets that are using a nonauthentic source address.

The NCEM may also drop particular types of packets that are being transmitted in excess of a specified limit. In one type of DOS attack, a malicious network node may transmit a large number (a "flood") of DNS requests to a target DNS server. To address this problem, the NCEM may drop DNS request packets that are transmitted in excess of a limit rate, such as one packet per second. By allowing some DNS request packets, the NCEM allows legitimate usage of the domain name system while denying the flood of packets that are transmitted during a typical DNS attack.

Other protocol types/packets may be similarly rate limited, such as TCP SYN packets. A TCP SYN packet is transmitted to initiate the process of establishing a TCP connection between two network nodes. In a DOS attack, a malicious node may send a flood of TCP SYN packets (typically with a false source IP address) to consume the resources of a target node. The NCEM may drop TCP SYN packets that are transmitted in excess of a specified rate (e.g., one packet per second). By enforcing a reasonable rate limit, the NCEM allows legitimate network connection requests while disallowing a flood of TCP SYN packets that would be transmitted as part of a DNS attack.

Voice Over Internet Protocol ("VoIP") calls may be similarly rate limited. So-called "robocalls" that are automatically initiated telephone calls are increasingly becoming a problem for consumers and network providers. Such calls are made for reasons that in many cases an annoyance (e.g., unsolicited telemarketing) and in some cases unlawful, such as to obtain information for identity theft, credit card fraud, or the like. Excess calls can also strain the resources of network providers. One embodiment rate limits the volume of VoIP traffic by dropping and/or limiting the number of SIP ("Session Initiation Protocol") INVITE requests.

The NCEM may execute on different types of computing systems or devices. The NCEM may perform its functions at packet ingress, egress, or both. One version of the NCEM may execute on a source node, such as a client endpoint computing device, including personal computers/devices, home appliances, thermostats, security systems, cameras, media devices, and the like. A second version of the NCEM may execute on an intermediate node, such as a networking device, including a wireless access point, router, switch, gateway, cable modem, or the like. A third version of the NCEM may execute on a destination node, such as a server endpoint computing device, including a DNS server, Web server, file server, or the like.

Figure 1:
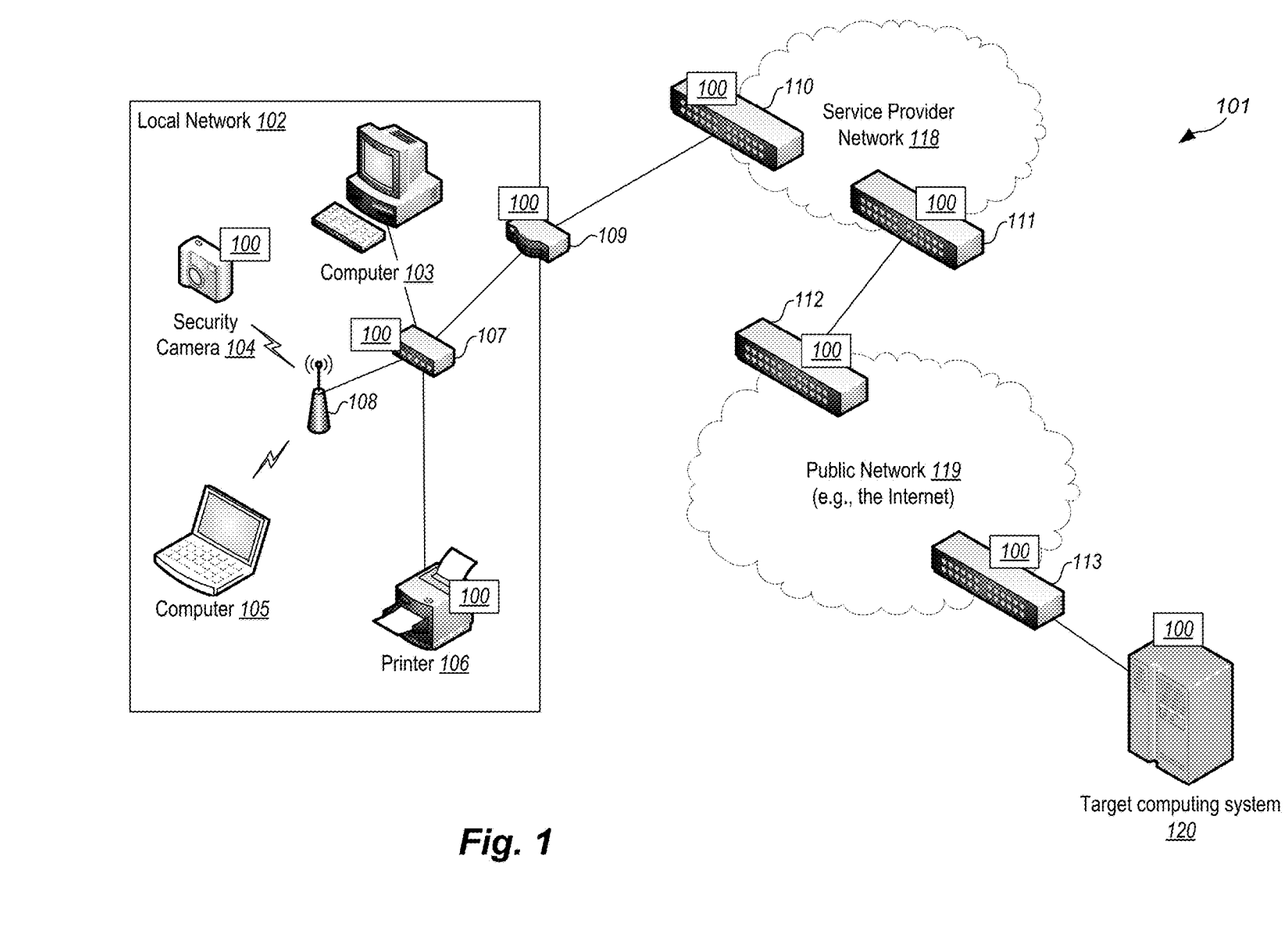
FIG. 1 is a block diagram that depicts a typical network that includes networking devices configured to perform network traffic control according to an example embodiment.

FIG. 1 is a block diagram that depicts a typical network that includes networking devices configured to perform network traffic control according to an example embodiment. The described network traffic control techniques may be employed to suppress denial of service attacks, limit network traffic flows, limit network traffic types, or the like. FIG. 1 shows a network 101 that includes a local network 102, a service provider network 118, and a public network 119 (e.g., the Internet).

The local network 102 may be a small network typically found in a home or business setting. The local network 102 includes multiple connected devices (each of which may act as a "source node"), such as a desktop computer 103, a security camera 104, a laptop computer 105, and a printer 106. The network 102 is managed by a first networking device 107, which is connected (via network cable connection) to the desktop computer 103, a wireless access point 108, and the printer 106. The networking device 107 may be a router, switch or similar device that manages the flow of packets over the local network 102. The networking device 107 has an uplink to a cable modem 109 or similar gateway device. The wireless access point 108 establishes a wireless network that is used by the security camera 104 and the laptop computer 105. The cable modem 109 provides a gateway to a service provider network 118. The networking device 107, wireless access point 108, and cable modem 109 are all examples of "intermediate nodes."

The service provider network 118 includes a first router 110 and a second router 111. The second router 111 acts as a gateway device between the service provider network 118 and a public network 119, such as the Internet. The public network 119 also includes multiple networking devices, such as routers 112 and 113, which are also examples of "intermediate nodes."

In this example, router 113 forwards traffic from the public network 119 to the target computing system 120. The target computing system is an example of a "destination node." Compromised connected devices on network 102, such as the security camera 104, can attack the target computing system 120 by transmitting a flood of packets (e.g., DNS requests, TCP SYN packets). Alone, a single device typically cannot generate enough traffic to tax the resources (e.g., memory, compute cycles, network capacity) provided by the target computing system 120. However, many devices acting in concert can generate a traffic flow that is sufficient to overwhelm the target computing system 120.

In typical embodiments, one or more of the illustrated networking devices (intermediate nodes) execute a Network Communication Evaluation Module ("NCEM") 100. In this example, an NCEM 100 executes on the networking device (e.g., router) 107, the cable modem 109, and each of the routers 110-113. The NCEM 100 is configured to drop packets that meet one or more conditions, including packets with false source IP addresses and/or packets of a particular type that are transmitted in excess of a limit rate. On intermediate nodes such as routers, valid IP addresses may be verified with respect to one or more tables (e.g., routing tables, ARP caches) that are maintained by the router, as discussed further below. In the illustrated example, suppose a malicious party has gained unauthorized access to the security camera 104. The malicious party can then install and execute malicious code that causes the camera 104 to transmit a large number of DNS requests (e.g., 100 or 1000 packets per second) to the target computing system 120. These packets will not travel beyond the networking device (e.g., router) 107, however, because the NCEM 100 executing there will drop the packets because they are being transmitted at a rate that exceeds the allowable rate limit.

It is also possible for source and destination nodes to execute an NCEM 100. For example, in FIG. 1, the security camera 104 and printer 106 are source nodes that also include an NCEM 100. Similarly, the target computing system 120 may execute an NCEM 100. The NCEM 100 executing on these source and destination nodes can also perform packet filtering according to specified rules, although the rules may be somewhat different than those for intermediate or destination nodes. For example, the NCEM 100 executing on the target computing system 120 may not filter packets based on whether an authentic source address is used, but may still enforce packet flow limits.

In typical embodiments, multiple NCEM 100 are employed along a packet transmission path so that packets transmitted by upstream networking devices may also be evaluated. For example, it is possible that the networking device 107 has itself been compromised, and is also enlisted by a malicious party to flood the target system 120 with DNS requests. In order to account for this scenario, the gateway 109 itself executes an NCEM 100 that evaluates packets received from the networking device 107. Similarly, the router 110 of the service provider executes an NCEM 100 in order to evaluate packets received from the gateway 109, in case the gateway 109 has itself been compromised. By implementing a chain of evaluation modules, the described system provides a layered approach to suppressing DOS attacks that may utilize compromised networking devices, such as routers and gateways.

In some cases, the operation of the NCEM 100 may be remotely controlled or configured. For example, an internet service provider (e.g., the operator of network 118) may transmit rules to all of the gateway devices (e.g., cable modems) installed in its customer residences. These rules may be dynamically updated based on various factors, such as the discovery of a new network attack, time of day, geographic location, or the like. In some cases, the rules may reflect different service levels purchased from the service provider by a customer. For example, a business customer with many users may purchase a service plan that allows a higher rate of TCP connection, DNS requests, or the like.

In some embodiments, the NCEM 100 maintains a table that has (1) a set of fixed entries that each include a trusted source IP address (or range of IP addresses) and (2) a set of dynamic entries that each include a questionable or unknown source IP address (or range of IP addresses). Each entry may include or identify one or more rules (e.g., flow limits) for processing packets received from the corresponding IP address. The trusted IP addresses are associated with hosts, persons, and/or organizations that are known by the administrator of the NCEM 100 to be trusted, such as by contractual relationship, based on security certification, or the like. For example, one entry may include an IP address associated with a business that purchases services (e.g., DNS services) from the entity that operates the target computing system 120. As another example, one entry may include an IP address associated with network 102 and/or 118, based on a certification or other indication that devices in those networks employ the security techniques described herein and/or other security protocols. The NCEM 100 allows high (or unlimited) packet flows from the trusted sources. The flow limits may be specified on a per-entry basis, such that different flow levels can be enforced depending on a business relationship (e.g., service level agreement) or other factors.

In the above-described table, questionable IP addresses may be associated with hosts that have not been identified to the NCEM as trusted. For the questionable IP addresses, the NCEM may enforce lower packet flow limits in addition to other requirements, such as checking the validity of the IP address by checking to determine whether it is the same as an IP address previously associated with a corresponding hardware address.

Note also that some embodiments may filter or flow limit packets based on data that is stored based on the functions of the device on which the NCEM executes. For example, if the NCEM executes on an intermediate node such as a router, the NCEM may verify source IP addresses based on one or more tables or caches maintained by the router, including a routing table, ARP cache, or DHCP table. For example, when a packet is received on a network interface of the router, the source IP address of the packet may be checked against the addresses (or address ranges) associated with the network interface. If the IP address is not present (or within an acceptable range), then the IP address is not valid.

Different kinds or formats of IP addresses may be stored in the table. For example, the table may associate flow control rules with IPV4 and IPV6 addresses. In the case of IPV4 addresses, the table will typically store a combination of an IP address and a TCP/UDP port number in order to uniquely identify a source device, user, and/or process. In the case of Network Address Translation ("NAT"), many different devices will share the routable IP address of the gateway device (e.g., router 107 and/or cable modem 109). By storing the TCP/UDP port along with the IP address, it is possible to distinguish between different devices and the communicating processes on those devices. In the case of IPV6, a port number may also be used to distinguish between different communicating processes, in order to enforce fine-grained (process-level) flow control.

In some embodiments, the described techniques take advantage of the fact that the source and/or destination addresses cannot in general be "faked" when establishing or engaging in a TCP/IP session and/or a variety of other protocols. Put another way, because these protocols rely on the use of valid addresses, the presence of an invalid address (e.g., a source address that does not match the address of the source node) implies that the protocol is being used for illegitimate purposes. For example, if a source node uses a false source address, then the destination node will not be able to properly address a return (e.g., SYN-ACK) packet. While it is possible to specify a false IP address in a SYN packet, such a false address would cause the establishment of a TCP/IP session to fail, because it would not be possible to handshake with the source node (since a false IP address would cause the return packet to be misrouted). As another example, it is very likely not legitimate for a source node to transmit a DNS request (over UDP) that has a false source address, because the answer to the request would never reach the source node. It is possible in many contexts to determine whether a false IP address is being used in a packet. For example, if a router receives a SYN packet from a source node that has an IP address that does not match the IP address assigned to the source node, then the packet IP address is false because there is no legitimate reason for a node to transmit a SYN packet that does not have a source address that is the actual address of the node. Other approaches to identifying false IP addresses will be described further below.

Note that, although many of the techniques are herein described with respect to a networking device (e.g., a router), at least some of the techniques can be employed by client and/or server systems themselves. For example, the target system 120 may itself drop packets that exceed specified packet flows, such as by reference to a table that associates network addresses with corresponding packet flow limits. As another example, computer 103 (or some other endpoint machine in network 102) may include a module that performs egress filtering based on packet flow limits (e.g., no more than 1 DNS request per second), thereby making it more difficult for malicious code executing on the computer 103 to flood the network with requests.

Figure 2A:
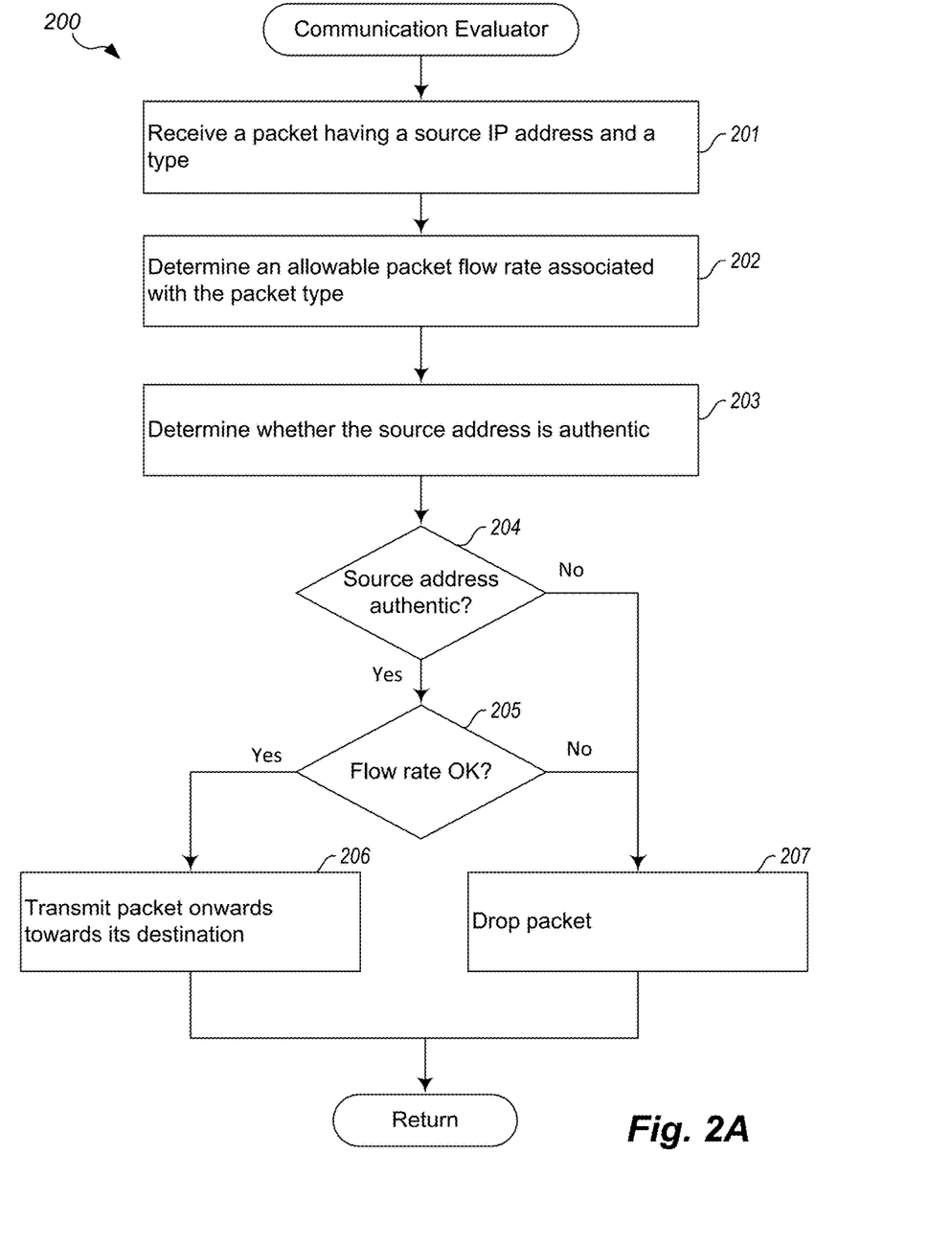
FIG. 2A is an example flow diagram of a network traffic control process performed by a first example embodiment.

FIG. 2A is an example flow diagram of a network traffic control process performed by a first example embodiment. In particular, FIG. 2A shows a communication evaluator process 200 that may be performed by the NCEM 100 described with respect to FIG. 1, above. The described process typically runs on a source network node (e.g., a security camera, appliance-based computing device, personal computing device) or an intermediate network node, such as a networking device (e.g., routers, gateways, switches) that facilitates the transmission of packets within or across networks. By way of summary, the process receives a packet from a packet source (e.g., a program on the device or some other transmitting device or node), and then determines whether to either drop the packet or transmit it towards its destination.

In block 201, the process receives a packet having a source IP (Internet Protocol) address and a type. If the process is running on a source node, the packet is initiated by a program that is attempting to transmit data to another network node. In such cases, the packet is typically received from a networking buffer or similar structure within the protocol stack. If instead the process is running on an intermediate node (e.g., router), the packet is typically received from a first network interface, where it has been received from some other node. The source address and type can typically be determined with respect to the packet header. The type may be determined based on a destination port that identifies a network protocol, such as HTTP, FTP, DNS, or the like.

In block 202, the process determines an allowable packet flow rate associated with the packet type. In some embodiments, the process records a specified allowable flow rate for different packet types. For example, an allowable flow rate for DNS requests may be 1 packet every 10 seconds. An allowable flow rate for TCP connection (SYN) packets, may be 1 packet every second. Typically, these limits are established by some trusted entity and are not modifiable by a user. For example, they may be hard coded (e.g., stored in a ROM) into a particular device. Alternatively, they may be set via use of administrator privileges, which are only held by an internet service provider or similar entity that administers the device.

In block 203, the process determines whether the source address is authentic. On a source node, determining whether the source address is authentic can include checking whether the IP address is one that has been assigned to the computing device that executes the process 200. For example, during network initialization, the source node may obtain an IP address from a DHCP server. The NCEM may store this address in order to check that it is being used as a source address by subsequent network transmissions.

On an intermediate node, such as a router or switch that is within a given network path, determining whether the source address is authentic can be performed by checking a packet source address against routing data (e.g., a routing table, DHCP table, ARP cache) that is maintained by the intermediate node. After a packet is received on a given network interface of an intermediate node, the packet is inspected to recover the source IP address. The intermediate node then determines whether the source address is authentic by reference to one or more of an ARP cache, routing table, or DHCP table, as described further below.

In the case of a typical router that is on the same LAN segment or broadcast domain as the transmitting device, an IP address can be verified in reference to an ARP ("Address Resolution Protocol") table or cache that stores associations between IP addresses and MAC addresses. If no entry is found in the ARP table, the process may transmit a broadcast query to other hosts on the network to identify themselves as users of the IP address and to provide their MAC address. The received MAC address is stored for future use, and is also used to verify the validity of the source IP address.

In the case of intermediate nodes that are not on the same network segment as the transmitting device, an IP address can be verified by reference to a routing table. First, the process determines the network interface (e.g., hardware interface or VLAN) that is the source of the incoming packet. Then, the process determines the assigned IP address ranges associated with the determined network interface. The source IP address is considered authentic if it is within the assigned IP address range. If instead the source IP address is not within the IP address range, the source address is false.

If the intermediate node also functions as a DHCP server, the source IP address can also or instead be verified by comparing the source address to an address assigned to the transmitting device via DHCP or similar protocol. This may include obtaining a hardware identifier (e.g., MAC address) used by the transmitting device, which can be readily obtained from the data link layer (e.g., Ethernet) of the protocol stack. This hardware identifier can be used to look up the legitimate IP address assigned to the transmitting device. If the legitimate IP address does not match the packet source address, the source address is false.

In block 204, if the source address is authentic, the process proceeds to block 205, otherwise to block 207.

In block 205, if transmitting the packet is within the allowable flow rate, the process proceeds to block 206, otherwise to block 207. In some embodiments, the process tracks or records the number of packets being transmitted, so that the process can determine a current packet flow rate. For example, the process may track how many DNS request packets (or TCP-SYN or SIP INVITE packets) have been transmitted over some time window preceding the current time, such as during the last second, 10 seconds, 1 minute, or the like. Then, the process can determine whether also transmitting the current packet would exceed the allowable packet flow rate determined at block 202, above.

In block 206, the process transmits the packet onwards towards its destination. In a source node, this typically includes transmitting the packet on a network interface to some intermediate network node. In an intermediate node, transmitting the packet typically includes transmitting the packet on a second network interface that is coupled directly or indirectly to the destination node. With reference to FIG. 1, this may include transmitting a packet received by the gateway device 109 from the local area network 102 onwards to the router 110 of the service provider network 118.

In block 207, the process drops the packet. The process may also record the fact that the packet has been dropped. The process may also transmit a notification that packets are being dropped due to false addresses or excessive flow rates. This may provide a sort of "early warning system" of a developing DOS attack.

The process 200 may also utilize a table to store flow control rules and/or to cache information about particular IP addresses. For example, an intermediate node (e.g., router 107) may maintain a table that associates IP addresses of machines on the local network 102 with flow control rules. When a packet is received from a given IP address (possibly combined with a port number), the process 200 looks up the IP address in the table. If there is no entry, it attempts to verify the IP address as above and creates a new table entry with an indication of the invalidity of the address or a default flow control rule. If there is an entry, the process 200 looks up the corresponding flow control rule and current actual flow rate stored in the table. Given this information, the process 200 decides whether to allow or drop the packet, as described above.

Figure 2B:
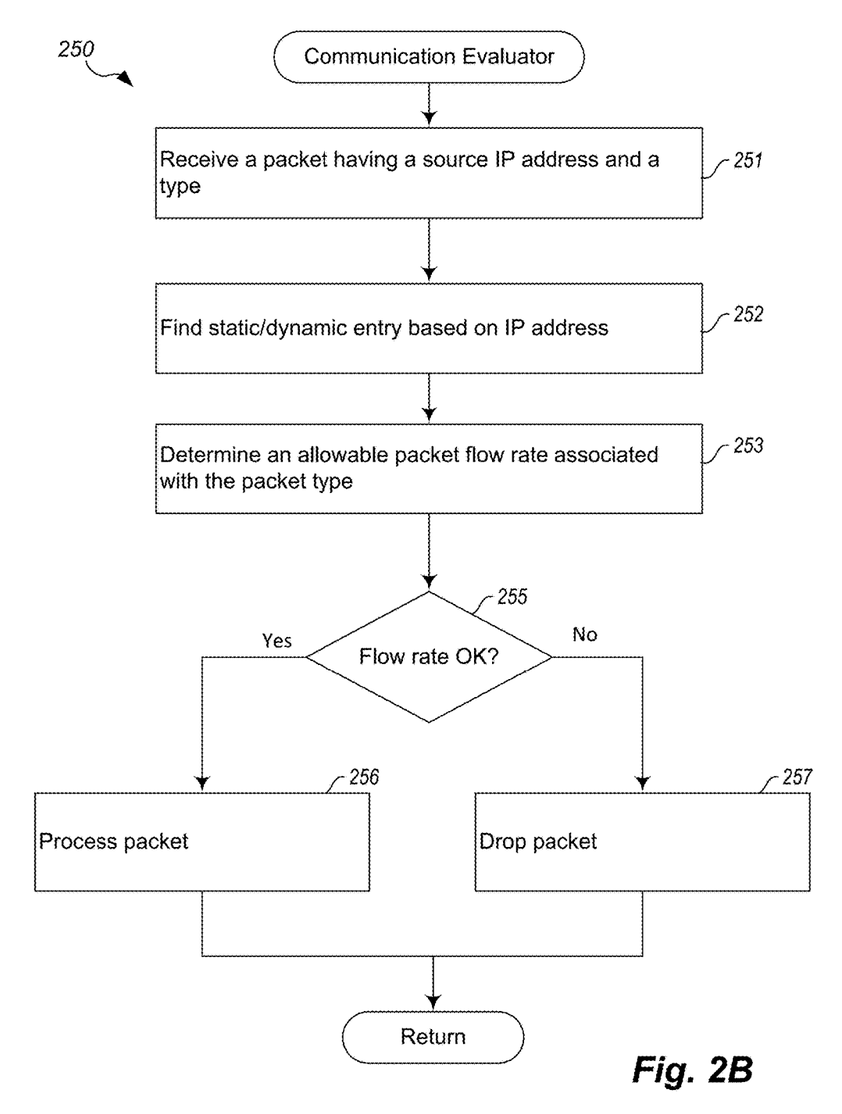
FIG. 2B is an example flow diagram of a network traffic control process performed by a second example embodiment.

FIG. 2B is an example flow diagram of a network traffic control process performed by a second example embodiment. In particular, FIG. 2B shows a communication evaluator process 250 that may be performed by the NCEM 100 described with respect to FIG. 1, above. The described process typically runs on a destination network node, such as the target computing system 120 of FIG. 1. By way of summary, the process receives a packet from a packet source (e.g., a program on the device or some other transmitting device or node), and then determines whether to either drop or process the packet.

In block 251, the process receives a packet having a source IP (Internet Protocol) address and a type. On a destination node, such as a DNS server, the packet is typically received from a first network interface, where it has been received from some other node. The source address and type can typically be determined with respect to the packet header. The type may be determined based on a destination port that identifies a network protocol, such as HTTP, FTP, DNS, or the like.

In block 252, the process finds a static/dynamic entry based on the source IP address. The destination node maintains a table (or similar data structure) that associates IP addresses (or ranges) with static and dynamic entries. An entry stores flow rate rules, possibly on a per-type basis, so that different flow rates for different types of traffic may be enforced.

Static entries store information about hosts that are known a priori to the destination node. Typically, static entries are associated with trusted IP addresses, including addresses of computing systems which have been promised a particular level of service. However, static entries can also be associated with known untrustworthy IP addresses (or ranges), such as ranges associated with countries or regions that are the source of malicious code or activity.

Dynamic entries are used to store information about nodes that become known to the process at runtime. For example, a DNS server (as target computing system 120) may only become aware of communication from network 102 at runtime, based on a DNS request sent from the computer 103 or some other node. For such entries, the process establishes default flow rates, although these can be altered depending on the traffic flow.

In block 253, the process determines an allowable packet flow rate associated with the packet type. As noted, each table entry includes one or more flow rate limits associated with different packet/traffic types. Determining the allowable flow rate includes looking up the corresponding flow rate limit associated with the packet type.

In block 255, if processing the packet is within the allowable flow rate, the process proceeds to block 256, otherwise to block 257. In some embodiments, the process tracks or records the number of packets received and/or processed, so that the process can determine a current packet flow rate. For example, the process may track how many DNS request packets have been received and/or processed over some time window preceding the current time, such as during the last second, 10 seconds, 1 minute, or the like. Then, the process can determine whether also processing the current packet would exceed the allowable packet flow rate determined at block 253, above.

In block 256, the process processes the packet. Typically, this includes storing the packet in a packet queue for processing by some application/server program.

In block 257, the process drops the packet. The process may also record the fact that the packet has been dropped. The process may also transmit a notification that packets are being dropped due to excessive flow rates. This may provide a sort of "early warning system" of a developing DOS attack.

The process may also update established flow limits. For example, if a packet received from a given IP address exceeds an allowable flow rate, the process may further reduce the allowable flow rate associated with that IP address in order to further diminish the effect of packets received from that IP address. The process may also notify other "upstream" NCEMs that a particular IP address is misbehaving. Such reductions may in some cases be temporary, in that they can be later raised when traffic from the IP address has returned to more normal levels.

Figure 3:
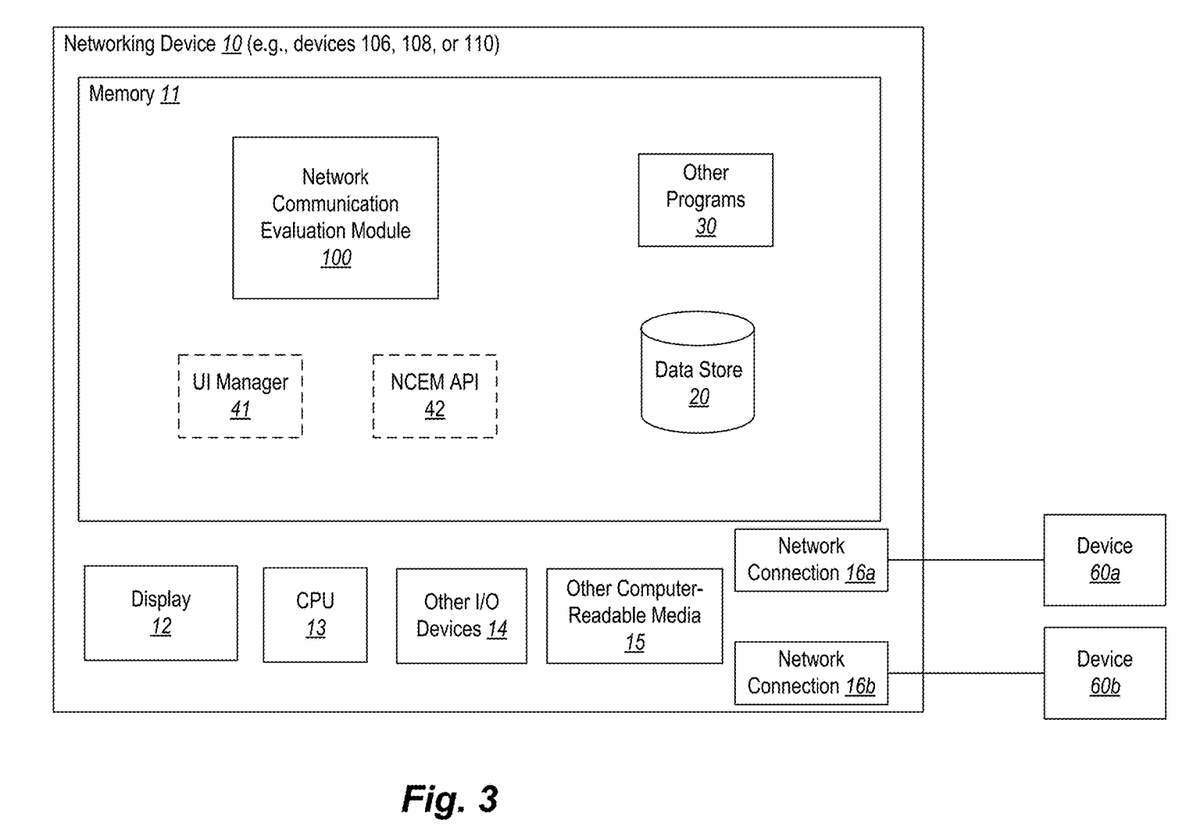
FIG. 3 is a block diagram of an example computing system or device for implementing and performing network traffic control according to an example embodiment.

FIG. 3 is a block diagram of an example computing system or device for implementing and performing network traffic control according to an example embodiment. In particular, FIG. 3 shows a networking device 10 that executes a Network Communication Evaluation Module ("NCEM") 100 that implements at least some of the techniques described herein. The device 10 may be a router, access point, gateway or similar networking device. In other embodiments, the NCEM 100 may execute on other types of computing devices, including desktop computers 103, laptop computers 105, mobile devices (e.g., smart phones, tablets), connected devices 104, 106 (e.g., network-capable thermostats, cameras, appliances), or the like. As noted, variations of the NCEM may also execute on destination nodes, such as the target computing system 120.

Note that one or more general purpose or special purpose computing systems/devices may be used to implement and/or execute the module 100. However, just because it is possible to implement the module 100 on a general purpose computing system does not mean that the techniques themselves or the operations (taken alone or in combination) required to implement the techniques are conventional or well known. In addition, the device 10 may comprise one or more distinct computing systems/devices and may span distributed locations. Furthermore, each block shown may represent one or more such blocks as appropriate to a specific embodiment or may be combined with other blocks. Also, the module 100 may be implemented in software, hardware, firmware, or in some combination to achieve the capabilities described herein.

In the embodiment shown, device 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16a and 16b. The module 100 is shown residing in memory 11. In other embodiments, some portion of the contents, some or all of the components of the module 100 may be stored on and/or transmitted over the other computer-readable media 15. The module 100 preferably executes on one or more CPUs 13 and performs the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 3 may not be present in any specific implementation. For example, some embodiments may not provide other computer readable media 15 or a display 12.

The module 100 interacts using network connections 16a and 16b with devices 60a and 60b, respectively. For example, in the context of the local area network 102 of FIG. 1, if device 10 is the router 107, then device 60a is one or more of the connected devices 103-106, and device 60b is the gateway 109. Similarly, if the device 10 is the gateway 109, then device 60a is the router 107 and device 60b is the router 110 of the service provider network 118.

The module 100 is shown executing in the memory 11 of the device 10. Also included in the memory 11 are a user interface manager 41 and an application program interface ("API") 42. The user interface manager 41 and the API 42 are drawn in dashed lines to indicate that in other embodiments, functions performed by one or more of these components may be performed externally to the module 100.

The UI manager 41 provides a view and a controller that facilitate user interaction with the module 100 and its various components. For example, the UI manager 41 may provide interactive access to the module 100, such that users or administrators can interact with the module 100, such as by modifying configuration settings, viewing logs, or the like. In some embodiments, access to the functionality of the UI manager 41 may be provided via a Web server, possibly executing as one of the other programs 30.

The API 42 provides programmatic access to one or more functions of the module 100. For example, the API 42 may provide a programmatic interface to one or more functions of the module 100 that may be invoked by one of the other programs 30 or some other module. In this manner, the API 42 facilitates the development of third-party software, such as user interfaces, plug-ins, adapters (e.g., for integrating functions of the module 100 into Web applications), and the like. In some embodiments, rules applied by the module 100 can be established and/or modified programmatically via API 42.

In addition, the API 42 may be in at least some embodiments invoked or otherwise accessed via remote entities, such as code executing on one of the devices 60a and 60b, to access various functions of the module 100. For example, if the device 60b is a service provider system or device, the service provider can transmit evaluation rules to the module 100 via the API 42. In this way, the service provider can remotely control the operation of all of the many networking devices deployed at customer locations, so as to even dynamically respond to a DOS attack.

In an example embodiment, components/modules of the module 100 are implemented using software programming techniques. For example, the module 100 may be implemented as a "native" executable running on the CPU 13, along with one or more static or dynamic libraries. In other embodiments, the module 100 may be implemented as instructions processed by a virtual machine that executes as one of the other programs 30. In general, a range of programming languages may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The various components may be implemented using more monolithic programming techniques, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the module 100, such as in the data store 20, can be available by language-specific APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the module 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage media. Some or all of the system components and data structures may also be stored as data signals (e.g., by being encoded as part of a carrier wave or included as part of an analog or digital propagated signal) on a variety of computer-readable transmission media, which are then transmitted, including across wireless-based and wired/cable-based media, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While embodiments of the invention have been illustrated and described, as noted above, many changes can be made without departing from the spirit and scope of the invention. Accordingly, the scope of the invention is not limited by the above disclosure.

The invention claimed is:

1. A system for suppressing denial of service attacks, the system comprising:
a first computing device that includes a first network interface, a second network interface, a processor, and a memory that stores a first code module that is configured, when executed by the processor, to:
receive, via the first network interface, a packet to be transmitted to a destination computing device, wherein the packet has a source IP address and a packet type;
determine a first allowable packet flow rate associated with the packet type;
determine whether the source IP address is authentic;
when the source IP address is non-authentic or when transmitting the packet would exceed the first allowable packet flow rate, drop the packet; and
otherwise, when the source IP address is authentic and when transmitting the packet would not exceed the first allowable packet flow rate, transmit the packet via the second network interface; and
a second computing device that stores a second code module that is configured to:
receive the packet, wherein the packet is initiated by a program that is executing on the second computing device and that is attempting to transmit data to the destination computing device;
determine a second allowable packet flow rate associated with the packet type;
determine whether the source IP address is authentic; and
transmit the packet to the first computing device unless the source IP address is non-authentic or transmitting the packet would exceed the second allowable packet flow rate.

2. The system of claim 1, wherein the second computing device is executing malicious code that causes the second computing device to participate in a denial of service attack by transmitting packets to a target computing system, and wherein the packet received by the first computing device is a packet transmitted by the malicious code.

3. The system of claim 1, wherein the packet is a UDP packet and the packet type is a DNS request packet.

4. The system of claim 1, wherein the packet type is a TCP SYN packet.

5. The system of claim 1, wherein the first code module is further configured to:

determine a flow rate by determining how many packets of the packet type have been received during a time window preceding the current time; and
determine whether additionally transmitting the received packet would exceed the first allowable flow rate, wherein the first allowable flow rate defines a maximum number of packets that are allowed to be sent during the time window.

6. The system of claim 5, wherein the first allowable flow rate is no more than five packets per second.

7. The system of claim 1, further comprising:
a server computer that includes a third network interface and that executes a third code module that is configured to:
receive, via the third network interface, the packet;
determine a third allowable packet flow rate associated with the source IP address and packet type;
when processing the packet would exceed the third allowable packet flow rate, drop the packet; and
otherwise, when processing the packet would not exceed the third allowable packet flow rate, storing the packet in a packet queue for processing by the server computer.

8. The system of claim 1, wherein the first code module is configured to determine the first allowable packet flow rate by:
looking up the source IP address in a table that associates IP addresses with allowable flow rates;
when no entry for the source IP address is found in the table, creating a new entry with a default allowable flow rate; and
when an entry for the source IP address is found in the table:
retrieving the first allowable flow rate and a historical flow rate that reflects the actual flow rate in a time window preceding the current time; and
updating the historical flow rate to reflect transmission of the received packet.

9. A system for suppressing denial of service attacks, the system comprising:
a first computing device that includes a first network interface, a second network interface, a processor, and a memory that stores a first code module that is configured, when executed by the processor, to:
receive, via the first network interface, a packet having a source IP address and a packet type;
determine an allowable packet flow rate associated with the packet type;
determine whether the source IP address is authentic;
when the source IP address is non-authentic or when transmitting the packet would exceed the allowable packet flow rate, drop the packet; and
otherwise, when the source IP address is authentic and when transmitting the packet would not exceed the allowable packet flow rate, transmit the packet via the second network interface,
wherein the packet is received from a second computing device having a media access control address, and
wherein the first code module is further configured to:
determine whether the source IP address is authentic by comparing the source address to an IP address associated with the media access control address; and
drop the packet when the IP address associated with the media access control address is not the same as the source IP address.

10. The system of claim 9, wherein the IP address associated with the media access control address is an IP address assigned to the second computing device by the first computing device.

11. The system of claim 9, wherein the first network interface is connected to a local area network and wherein the second network interface is connected to a wide area network provided by an internet service provider.

12. The system of claim 9, wherein the first code module is further configured to:
determine a flow rate by determining how many packets of the packet type have been received during a time window preceding the current time; and
determine whether additionally transmitting the received packet would exceed the first allowable flow rate, wherein the first allowable flow rate defines a maximum number of packets that are allowed to be sent during the time window.

13. The system of claim 12, wherein the first allowable flow rate is no more than five packets per second.

14. The system of claim 9, wherein the first code module is configured to determine the first allowable packet flow rate by:
looking up the source IP address in a table that associates IP addresses with allowable flow rates;
when no entry for the source IP address is found in the table, creating a new entry with a default allowable flow rate; and
when an entry for the source IP address is found in the table:
retrieving the first allowable flow rate and a historical flow rate that reflects the actual flow rate in a time window preceding the current time; and
updating the historical flow rate to reflect transmission of the received packet.

15. A system for suppressing denial of service attacks, the system comprising:
a first computing device that includes a first network interface, a second network interface, a processor, and a memory that stores a first code module that is configured, when executed by the processor, to:
receive, via the first network interface, a packet having a source IP address and a packet type;
determine a first allowable packet flow rate associated with the packet type;
determine whether the source IP address is authentic;
when the source IP address is non-authentic or when transmitting the packet would exceed the first allowable packet flow rate, drop the packet; and
otherwise, when the source IP address is authentic and when transmitting the packet would not exceed the first allowable packet flow rate, transmit the packet via the second network interface,
wherein the first code module is further configured to:
determine whether the source IP address is authentic by looking up the source IP address in a routing table of the first computing device; and
drop the packet when the source IP address is not present in the routing table.

16. The system of claim 15, further comprising:
a client computing device that includes a third network interface and that executes a second code module that is configured to:
receive the packet, wherein the packet is originated by a third code module executing on the client computing device;

determine a second allowable packet flow rate associated with the packet type;

determine whether the source IP address is authentic;

when the source IP address is non-authentic or when transmitting the packet would exceed the second allowable packet flow rate, drop the packet, wherein the source IP address is not authentic when it is not an IP address assigned to the client computing device; and otherwise, when the source IP address is authentic and when transmitting the packet would not exceed the second allowable packet flow rate, transmit the packet via the third network interface.

17. The system of claim 16, wherein the client computing device is an endpoint computing device on a local area network, the endpoint computing device being one of a laptop computer, a desktop computer, a tablet computer, a media device, or an appliance-based computing device.

18. The system of claim 15, wherein the first code module is further configured to:

determine a flow rate by determining how many packets of the packet type have been received during a time window preceding the current time; and determine whether additionally transmitting the received packet would exceed the first allowable flow rate, wherein the first allowable flow rate defines a maximum number of packets that are allowed to be sent during the time window.

19. The system of claim 18, wherein the first allowable flow rate is no more than five packets per second.

20. The system of claim 11, wherein the first code module is configured to determine the first allowable packet flow rate by:

looking up the source IP address in a table that associates IP addresses with allowable flow rates;

when no entry for the source IP address is found in the table, creating a new entry with a default allowable flow rate; and when an entry for the source IP address is found in the table:

retrieving the first allowable flow rate and a historical flow rate that reflects the actual flow rate in a time window preceding the current time; and updating the historical flow rate to reflect transmission of the received packet.

* * * * *

UNITED STATES PATENT AND TRADEMARK OFFICE
CERTIFICATE OF CORRECTION

PATENT NO. : 10,277,626 B2
APPLICATION NO. : 15/808283
DATED : April 30, 2019
INVENTOR(S) : Daniel Chien Page 1 of 1

It is certified that error appears in the above-identified patent and that said Letters Patent is hereby corrected as shown below:

In the Claims

In Column 16, Line 8 (Claim 20), "11" should be --15--.

Signed and Sealed this
Twenty-fifth Day of June, 2019

Andrei Iancu
*Director of the United States Patent and Trademark Office*